US00RE38094E

(19) United States
(12) Reissued Patent
Buchalter

(10) Patent Number: US RE38,094 E
(45) Date of Reissued Patent: Apr. 29, 2003

(54) LOCKABLE QUICK RELEASE APPARATUS

(76) Inventor: Charles P. Buchalter, 6615 180th St., SW., Lynnwood, WA (US) 98037

(21) Appl. No.: 09/986,867

(22) Filed: Nov. 13, 2001

Related U.S. Patent Documents

Reissue of:
(64) Patent No.: 6,202,458
Issued: Mar. 20, 2001
Appl. No.: 09/145,966
Filed: Sep. 3, 1998

(51) Int. Cl.[7] ..... B62H 5/00; E05B 71/00
(52) U.S. Cl. ..... 70/233; 403/DIG. 4; 301/110.5; 301/124.2
(58) Field of Search ..... 70/233, 232, 234, 70/202, 203; 403/322.4, DIG. 4; 301/11.05, 124.2; 292/330, 285

(56) References Cited

U.S. PATENT DOCUMENTS

| | | | | |
|---|---|---|---|---|
| 4,028,915 | A | 6/1977 | Stahl | 70/233 |
| 4,114,409 | A | 9/1978 | Scire | 70/225 |
| 4,621,873 | A | 11/1986 | Weinstein et al. | 301/124 R |
| 4,674,306 | A | 6/1987 | Halpern | 70/233 |
| 4,724,692 | A | 2/1988 | Turin et al. | 70/225 |
| 4,770,011 | A | 9/1988 | Constant | 70/225 |
| 4,934,572 | A | 6/1990 | Bowman et al. | 224/42.45 R |
| 4,951,487 | A | 8/1990 | Sheils Dennis | 70/233 |
| 4,964,287 | A | 10/1990 | Gaul | 70/233 |
| 5,005,390 | A | 4/1991 | Giannini et al. | 70/225 |
| 5,007,260 | A | 4/1991 | Sharp | 70/233 |
| 5,022,672 | A | 6/1991 | Kawai | 280/281.1 |
| 5,027,628 | A | 7/1991 | De Rocher et al. | 70/233 |
| 5,291,763 | A | 3/1994 | Cuisinot | 70/201 |
| 5,319,992 | A | 6/1994 | Shui-Te | 74/543 |
| 5,337,587 | A | 8/1994 | Davidson | 70/233 |
| 5,362,173 | A | 11/1994 | Ng | 403/320 |
| 5,479,836 | A | 1/1996 | Chang | 74/551.1 |
| 5,511,894 | A | 4/1996 | Ng | 403/320 |
| 5,526,661 | A | 6/1996 | Lin | 70/233 |
| 5,598,959 | A | 2/1997 | Lorensen et al. | 224/315 |
| 5,673,925 | A | 10/1997 | Stewart | 280/279 |
| 5,813,258 | A | 9/1998 | Cova et al. | 70/225 |
| 6,167,735 | B1 * | 1/2001 | Brown | 70/19 |
| 6,260,931 | B1 * | 7/2001 | Stewart | 301/124.2 |
| 6,296,322 | B1 * | 10/2001 | Marzocchi et al. | 301/124.2 |
| 6,386,643 | B1 * | 5/2002 | Marzocchi et al. | 301/110.5 |

* cited by examiner

*Primary Examiner*—Anthony Knight
*Assistant Examiner*—John B. Wahl
(74) *Attorney, Agent, or Firm*—Hoffman, Wasson & Gitler, PC

(57) ABSTRACT

A lockable quick release mechanism is provided having a cam lever threaded onto a shaft which extends through and beyond a barrel nut, fitted in the cam lever so that it will provide interference with a padlock when locked. The cam lever has a lock hole for the padlock, and a curvature which, when locked, will stop the cam lever from being rotated more than a few degrees due to interference with the fork blade. A cam follower is provided on the shaft and has anti-rotation tabs, which fit into the clevis of the cam lever, and which engages the camming surface of the cam lever thereby preventing the cam lever from being rotated in the locked position due to the amount of friction between the cam follower and the fork tip. The cam follower is always biased by a spring against the camming surface to prevent a fork blade from being mis-positioned between the cam follower and the camming surface.

21 Claims, 7 Drawing Sheets

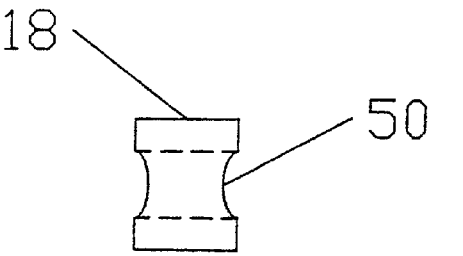
FIG. 5b
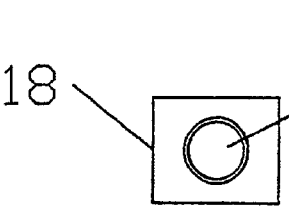
FIG. 5a
FIG. 5c

LOCKABLE QUICK RELEASE APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a quick release apparatus. More particularly, the present invention relates to a quick release apparatus to which a lock, such as a conventional padlock can be attached to prevent an item, such as a bicycle fork or bicycle seat post, from being disengaged.

2. Description of the Prior Art

Quick release mechanisms have become prevalent for use in securing bicycle wheels in place, and are finding increasing use in releasably securing seats to bicycle frames. Such quick release mechanisms typically have a hollow shaft, a skewer extending through the shaft, a nut on one end of the skewer, and a lever arm on the opposite end of the skewer. The lever arm can be pivoted to tighten or loosen the mechanism. For a bicycle wheel, the lever has a camming surface so that, as the lever is pivoted, the camming surface engages or disengages the adjacent fork blade.

A major drawback to such quick release mechanisms is that they make the bicycle and/or the wheel an easy target for theft. In order to prevent such theft, various mechanisms have been designed to lock the quick release mechanism. For example, U.S. Pat. Nos. 5,337,587; 5,598,959; 4,951,487; and 4,621,873 all disclose such locking devices. The devices taught by these patents have numerous disadvantages. In particular, the mechanisms are either complex, and therefore expensive, or are easily defeated. Furthermore, if the locking mechanism is too complicated and difficult to utilize, it will defeat the original purpose for the quick release mechanism, namely, the ability to rapidly assemble and disassemble the respective parts.

U.S. Pat. No. 5,337,587, to Davidson teaches a locking apparatus and gripless nut for securing quick release mechanisms. The Davidson device, however, requires significant extra hardware, and is therefore more expensive and difficult to operate.

U.S. Pat. No. 4,951,487 to Sheils Dennis relates to bicycle wheel lock mechanism which utilizes a rectangular metal plate having two holes, one for accommodating the skewer, and the other for accommodating a padlock. The plate is positioned so that the shackle of the lock fits through the second hole and around the lever arm, to prevent the lever arm from being rotated. The mechanism can be defeated by rotating the lever arm and the plate together so that the plate, lever and padlock come off the skewer together.

Weinstein, U.S. Pat. No. 4,621,873, discloses a quick release assembly with integral lock. By making the lock integral, the mechanism is [considerable] *considerably* more complex and expensive. Furthermore it is less versatile in that it can not be used with a conventional padlock.

U.S. Pat. No. 5,598,959, to Lorensen et al., pertains to an article-carrying rack with lockable mount. This device is also much more complex and employs an integral lock along with an intricate securing mechanism.

SUMMARY OF THE INVENTION

The forgoing and other deficiencies of the prior art are addressed by the present invention which is directed to a lockable quick release mechanism which is simple to attach and remove, makes theft extremely difficult, and is inexpensive.

The lockable quick release mechanism of the present invention replaces skewers for fork mount-style bike racks currently on the market, such as a 9 millimeter skewer. The locking mechanism utilizes a cam lever similar to the cam lever of a conventional quick release skewer having an external cam. The mechanism has a shaft which extends through and beyond a barrel nut, fitted in the cam lever so that it will provide interference with a padlock when locked. The cam lever has a lock hole for the padlock, and the cam lever has a curvature which, when locked, will stop the lever from being rotated more than a few degrees due to interference with the fork blade. A cam follower is provided on the shaft and has anti-rotation tabs, which fit into the clevis of the cam lever, which engages the camming surface of the cam lever and further prevents the cam lever from being rotated in the locked position due to the amount of friction between the cam follower and the fork tip. A spring is provided to bias the cam follower against the camming surface at all times thereby preventing a fork from being mis-positioned between the cam follower and the camming surface.

An object of the present invention is to provide a quick release locking apparatus which is of [simply] *simple* construction, and is relatively inexpensive to manufacture.

Another object of the present invention is to provide a quick release locking apparatus which can be used with a conventional padlock.

Yet another object of the present invention is to provide a quick release locking apparatus which is applicable to bicycle forks, seat posts, car top cargo carriers, surf board supports, or other items requiring positive locking.

Still another object of the present invention is to provide a quick release locking apparatus which is extremely theft resistant.

Another object of the present invention is to provide a quick release locking apparatus which prevents mispositioning of a bicycle fork.

Yet another object of the present invention is to provide a quick release locking apparatus which operates in a manner similar to conventional skewers and is therefor familiar to the user.

BRIEF DESCRIPTION OF THE DRAWINGS

These and other objects and attributes of the present invention will be described with respect to the following drawings in which:

FIGS. 5a–c are an end view and side views of a barrel nut fitted in the cam lever shown in FIGS. 1–3;

DETAILED DESCRIPTION OF THE INVENTION

Figure 1:
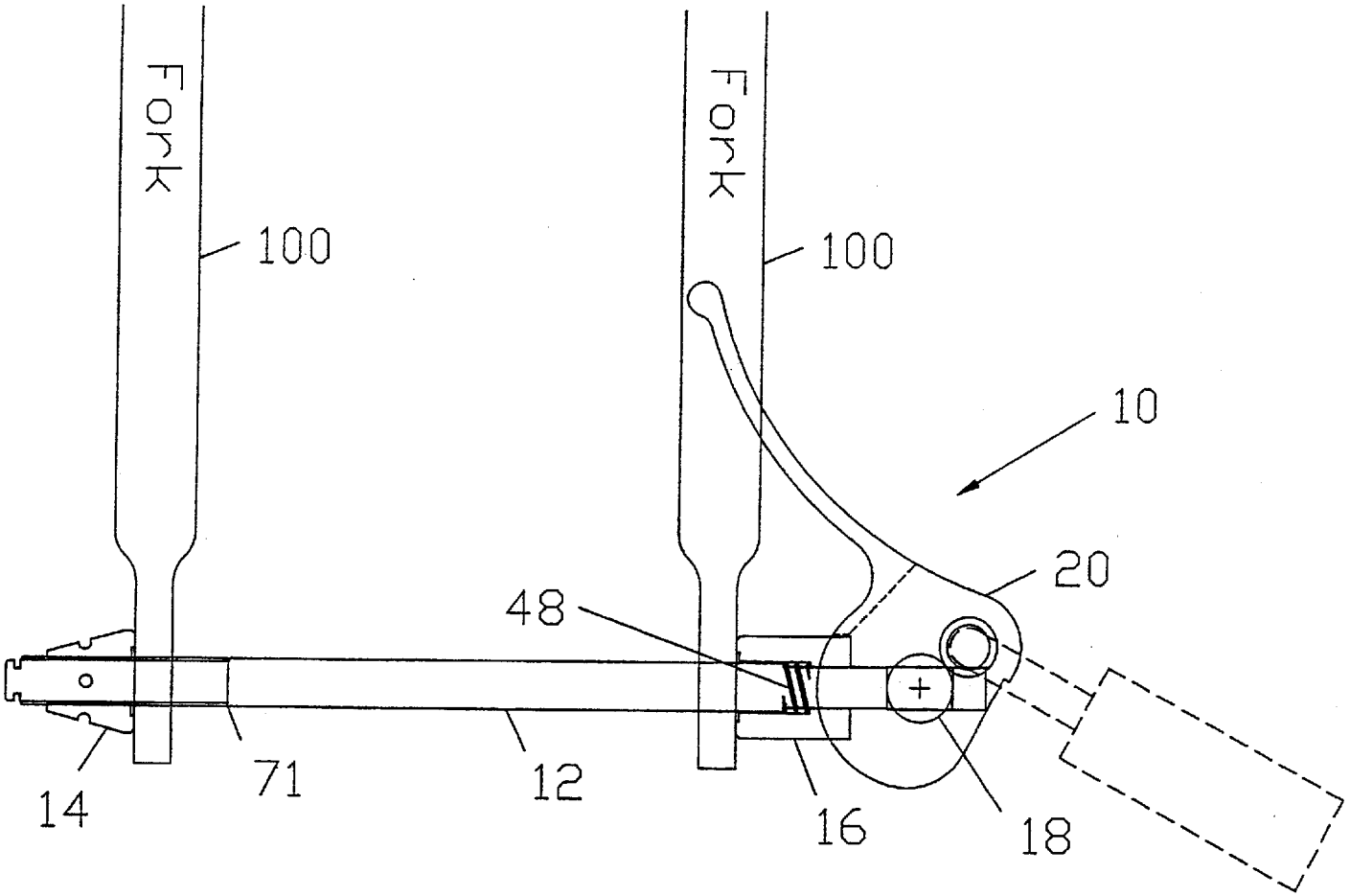
FIG. 1 is a cross-sectional view of the quick release apparatus of the present invention in the locked state and connected to a bicycle fork.

Referring to FIG. 1, the quick release apparatus 10 according to the present invention is shown in cross-section.

The quick release apparatus 10 includes a shaft 12, an adjuster nut 14, a cam follower 16, a barrel nut 18 and a cam lever 20. The quick release apparatus 10 is shown engaged with the blades 100 of a bicycle fork.

Figure 3:
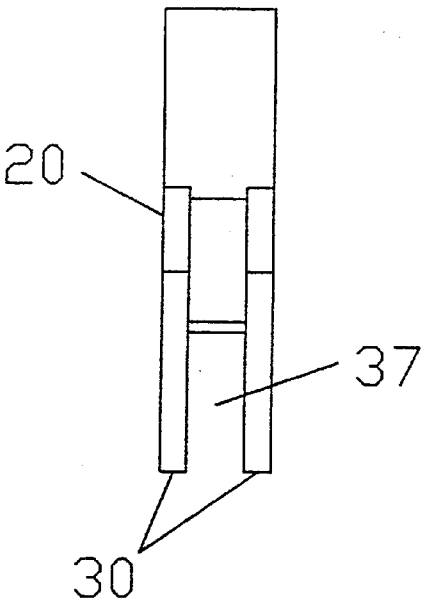
FIG. 3 is an end view of the cam lever shown in FIG. 2.
Figure 2:
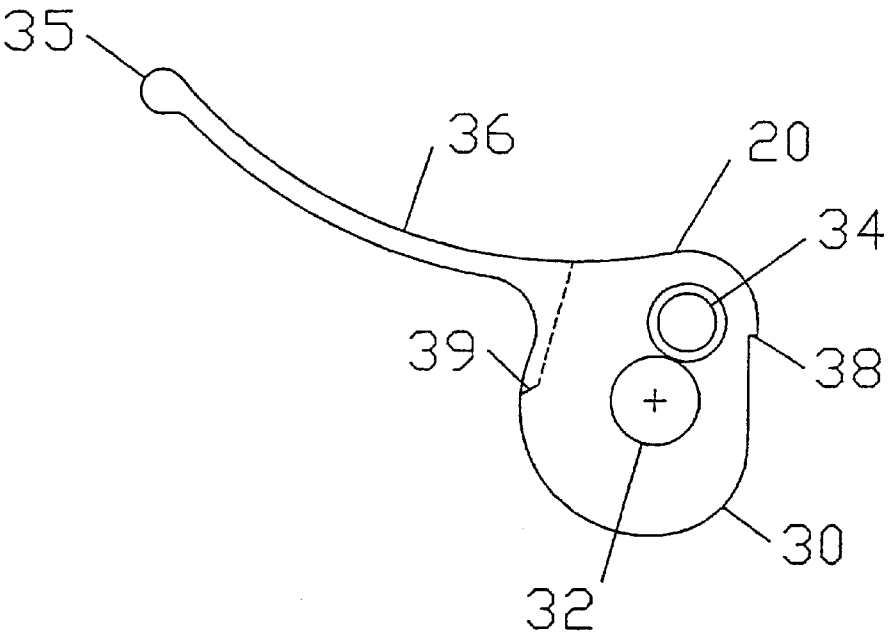
FIG. 2 is a side view of the cam lever shown in FIG. 1.
Figure 4A:
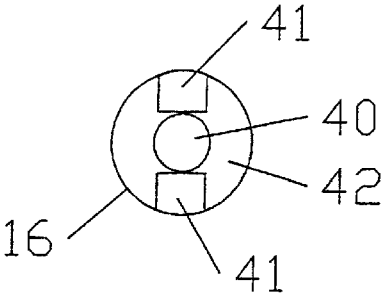
FIGS. 4a–e are side views end views and a cross-sectional view of the cam follower shown in FIG. 1.
Figure 4B:
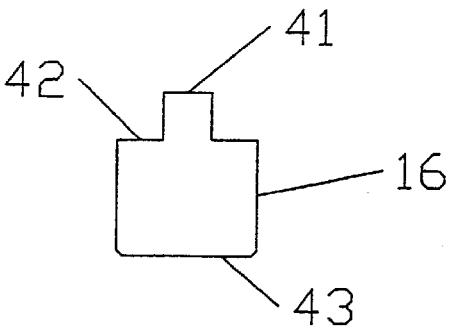
Figure 4C:
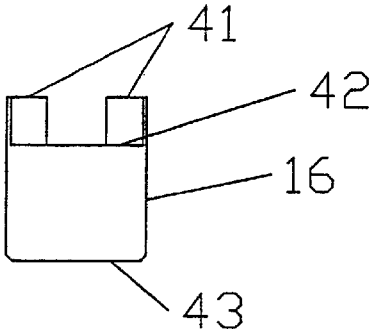
Figure 4D:
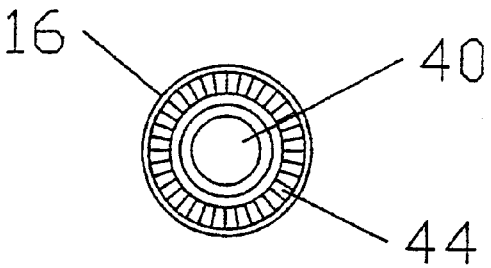
Figure 4E:
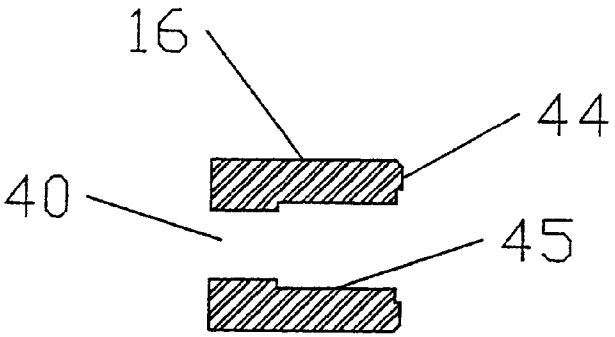

By far the most complex part of the quick release apparatus 10 is the cam lever 20, which is shown in greater detail in FIGS. 2 and 3. The cam lever 20 has a camming surface 30, a pivot hole 32 which accommodates the barrel nut 18, a lock hole 34 for accommodating a padlock (not shown), a handle 36, cam stops 38 and 39, and finger grip 35. Referring to FIG. 3, it can be seen that the quick release apparatus 10 has a groove or slot 37.

The cam follower 16 is shown in FIGS. 4a–e. The cam follower 16 is substantially cylindrical. Referring to end view 4a, the cam follower 16 has a through hole 40 formed concentrically in the cam follower 16. A pair of anti-rotation tabs 41 are provided on a first end 42 of the cam follower 16, as shown in side views 4b and 4c. The width of the anti-rotation tabs 41 is substantially equal to the width of the groove or slot 37 in the cam lever 20. The end 43 of the cam follower 16 opposite the first end 41 has a knurled surface 44. The through hole 40 has wider portion 45 which is a cavity for accommodating a spring 48 for biasing the cam follower 16 into engagement with the cam lever 20 at all times.

The barrel nut 18 is shown in FIGS. 5a–c, and has a cylindrical configuration. The outer diameter of the barrel nut 18 is substantially the same as the inner diameter of the pivot hole 32 in the cam lever 20. A threaded hole 50 is provided in [through] the side of the barrel nut 18 for threadably engaging the shaft 12. The barrel nut 18 rotates freely within the pivot hole 32.

Figure 6B:
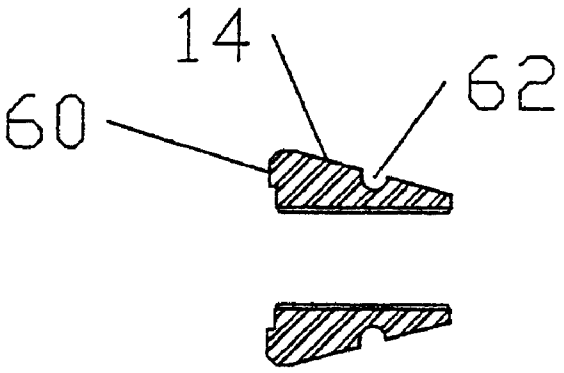
FIGS. 6a and 6b are a cross-sectional and end view of an adjuster nut shown in FIG. 1.
Figure 6A:
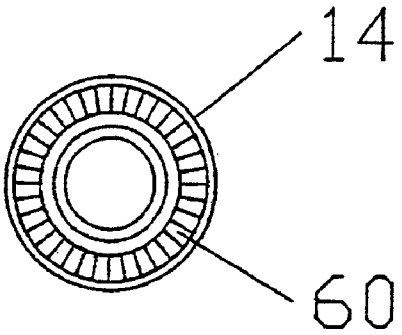

FIGS. 6a and 6b show an end and cross-sectional view of the adjuster nut 14, respectively. The end 60 of the adjuster nut 14 is knurled, and the outer profile is conical to prevent the use of a positive gripping tool such as a wrench, a vice grips or pliers. The conical taper of the adjuster nut 14 thus prevents gripping of the nut. A circular recess or groove 62 may be provided for accommodating a rubber or elastic o-ring to facilitate adjustment by fingers. The inner hole of the adjuster nut 14 is threaded to accommodate the threaded shaft 12.

Figure 7:
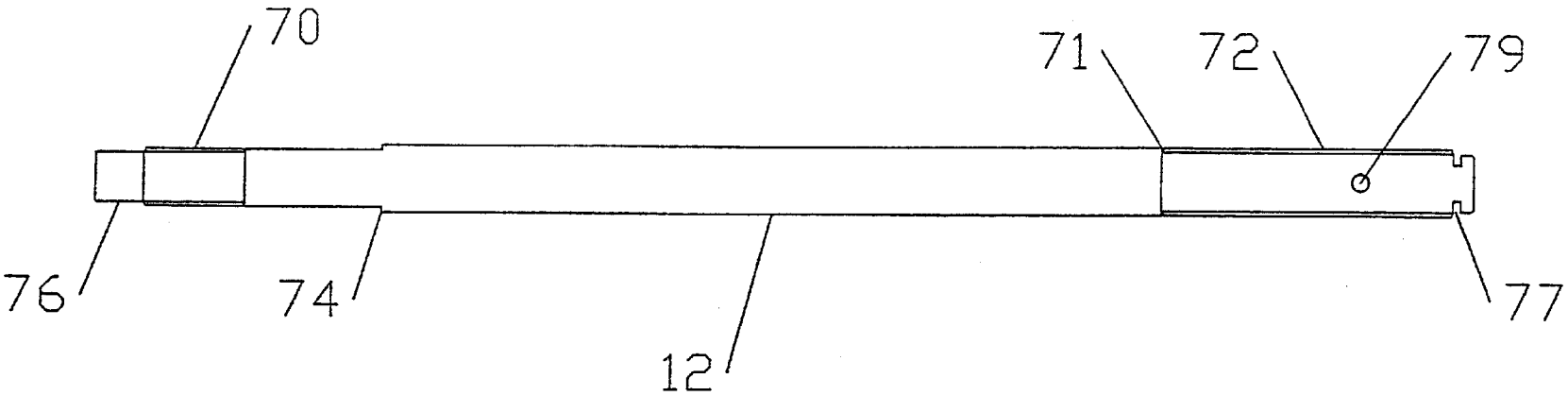
FIG. 7 is a side view of the skewer shaft shown in FIG. 1.

The shaft 12 is shown in FIG. 7 and has a first threaded end 70 for engagement with the barrel nut 18, a second threaded end 72 for engagement with adjuster nut 14, and a shoulder 74 for supporting the spring 48 in the cam follower 16. An interference extension 76 extends from the end 70, and will be described with regard to the operation of the apparatus below. The threaded portion of the first threaded end 70 meshes with the thread hole 50 of the barrel nut 18, and the interference extension is a continuation of the shaft 12 past the threading on the first end 70. A snap ring groove 77 is provided at end 72 to accommodate a snap ring (not shown) and prevent loss of the adjuster nut 14 and hence the lockable quick release apparatus 10 when no item, such as a bicycle, is locked in place. A hole 79 may he provided through the side of the shaft 12 for housing a nylon insert (not shown) to provide a friction locking feature with the adjuster nut 14. The second end 72 is threaded down to point 71. As shown in FIG. 1, the point 71 is well beyond the inner side of a fork blade 100. When no fork is locked on the apparatus 10, the adjuster nut 14 may be moved down to the point 71 and the cam lever moved to the locked position so that the apparatus 10 will not be inadvertently lost or stolen.

The barrel nut 18 fits into the pivot hole 32 of the cam lever [30] *20* so that its thread hole 50 is disposed between the sides of the cam lever 20. The spring 48 is positioned against the shoulder 74 of the shaft 12, and the shaft 12 is slid through the hole 40 of the cam follower 16 so that the spring 48 resides in the wider cavity 45 inside the cam follower 16. The threaded first end 70 of the shaft 12 is then threaded into the threaded hole 50 of the barrel nut 18. The anti-rotation tabs 41 of the cam follower 16 fit into the groove or slot 37 in the cam lever 20 to prevent the cam lever 20 from rotating when in the locked position. The adjuster nut 14 threads onto the threaded end 72 of the shaft 12 so that the knurled end 60 faces the cam follower 16.

When assembled as described above, the interference extension 76 extending from the end 70 of the shaft 12 lies adjacent the lock hole 34. When the blades 100 of a bicycle fork are fitted on the shaft 12, the knurled end 60 of the adjuster nut 14 abuts the outer surface of one blade 100, while the knurled surface 44 on the end 43 of the cam follower 16 abuts the outer surface of the other blade 100. The spring 48 biases the cam follower 16 into engagement with the cam lever 20 thereby preventing mis-positioning of one of the fork blades between the cam follower 16 and the cam lever 20.

The cam lever 20 has cam stops 38 and 39 disposed on opposite sides of the camming surface 30. The cam stops 38 and 39 limit the range of rotational movement of the shaft 12 relative to the cam lever 20. Cam stop 38 limits the cam lever 20 to the full open position, while the cam stop 39 defines the fully closed position, and is shown in FIG. 1.

Since the cam lever is similar to the lever of a conventional quick release skewer, it feels familiar to a user. Furthermore, the finger grip 35 facilitates opening and closing of the cam lever, by providing better grip to the user. When the quick release apparatus 10 is in the locked position shown in FIG. 1, the interference extension 76 extending from the end 70 of the shaft 12 lies adjacent the lock hole 34. When a padlock is insert through the lock hole 34 the cam lever 20 can not be opened due to the interference between the padlock and the interference extension 76.

In FIG. 1, the handle 36 of the cam lever 20 lies behind the adjacent fork blade 100. The handle 36 has a deliberate curvature so that, when the cam lever 20 is closed, the quick release apparatus can not be opened due to the padlock, and can not be rotated to unscrew the shaft 12 from the adjuster nut 14 or the cam lever 20 from the shaft 12. The cam lever 20 can not rotate past the fork blade 100. Furthermore, the cam follower 16 helps prevent the cam lever 20 from being unscrewed from the shaft 12 by providing additional friction against the fork blade 100.

The barrel nut 18 and the cam follower 16 are preferably made of a material such as bronze, thereby allowing smooth, low friction rotation of the cam lever 20 without gauling of the contact surfaces. Alternatively, or in addition, the parts may be coated with a friction reducing coating such as [TeflonTm] *Teflon*™. In conventional skewers, such a problem is overcome by using a polymer of [Delrinm] *Delrin*™ seat on the cam follower which increases the complexity of the device. The barrel nut 18 may be held in place *on shaft 12* using a high strength bonding agent or by mechanical means.

As stated previously, the quick release apparatus of the present invention may be used to lock a seat in place on a bicycle. To ensure proper operation in that circumstance, the curvature of the handle 36 of the cam lever 20 needs to curve enough so that in the locked position, one of the seat stays or other frame designs limits the rotation of the cam lever 20.

Having described several embodiments of the quick release apparatus in accordance with the present invention, it is believed that other modifications, variations and changes will be suggested to those skilled in the art in view of the description set forth above, such as utilizing the apparatus 10 to lock a car-top cargo carrier, a surf board support or other product support requiring locking. It is therefor to be understood that all such variations, modifications and changes are believed to fall within the scope of the invention as defined in the appended claims.

What is claimed is:

1. A lockable quick release apparatus comprising:

a cam lever comprising a camming surface, a handle, a lock hole for receiving a padlock and a pivot hole;

a cam follower which interacts with said camming surface of said lever;

a barrel nut pivotably fitted in said pivot hole;

a shaft having first and second threaded ends, said barrel nut being threaded on said first threaded end, and an adjuster nut threaded on said second threaded end; and a spring which biases a cam follower into engagement with said cam lever;

wherein said shaft having an interference extension at said first threaded end so that when said cam lever is in a closed position, a padlock extending through said lock hole in said cam lever abuts said interference extension preventing said cam lever from moving to an open position.

2. A lockable quick release apparatus as recited in claim 1, wherein said quick release apparatus attaches to blades of a bicycle fork, a first blade being disposed adjacent an end of said cam follower, and a second blade being disposed adjacent said adjuster nut.

3. A lockable quick release apparatus as recited in claim 2, wherein said end of said cam follower and an end of said adjuster nut are knurled.

4. A lockable quick release apparatus as recited in claim 1, wherein said adjuster nut has a conical outer profile to inhibit interaction with a forcible gripping device.

5. A lockable quick release apparatus as recited in claim 1, wherein said cam follower has a through hole through which said shaft extends.

6. A lockable quick release apparatus as recited in claim 5, wherein said shaft comprises a shoulder for supporting and locating said spring.

7. A lockable quick release apparatus as recited in claim 6, wherein said through hole in said cam follower has a wider diameter portion for accommodating said spring.

8. A lockable quick release apparatus as recited in claim 5, wherein said cam follower further comprises a pair of anti-rotation tabs extending from an end of said cam follower facing said cam lever, said cam lever having a slot, wherein said anti-rotation tabs are disposed in said slot to prevent rotation of said cam lever relative to said cam follower when in said locked position.

9. A lockable quick release apparatus as recited in claim 2, wherein said handle of said cam lever prevents said cam lever from rotating by abutting said first fork blade.

10. A lockable quick release apparatus as recited in claim 9, wherein said handle is curved so that said cam lever extends inward toward said adjuster nut to maximize an area of contact between said cam lever and said first fork blade.

11. A lockable quick release apparatus as recited in claim 1, wherein said cam lever further comprises a first cam stop and a second cam stop for engagement with said cam follower to limit the range of rotation of said cam lever relative to said cam follower.

12. A lockable quick release apparatus as recited in claim 4, wherein said adjuster nut has a groove formed in said conical outer surface, an o-ring being disposed in said groove to provide a gripping surface to turn said adjuster nut when said cam lever is in said open position.

13. A lockable quick release apparatus comprising:

a cam lever comprising a camming surface, a curved handle, a lock hole, a pivot hole and first and second cam stops;

a barrel nut [pivotable] *pivotably* mounted in said pivot hole, an adjuster nut having a threaded opening and a conical outer surface;

a cam follower which interacts with said camming surface of said cam lever, a through hole, said through hole having a wider diameter portion, a pair of anti-rotation tabs disposed on opposite sides of said through hole, said anti-rotation tabs engaging a slot formed in said camming surface to prevent rotation of said cam lever relative to said cam follower, when said cam lever is in a closed position;

a shaft having first and second threaded ends, said barrel nut being threaded on said first end and said adjuster nut being threaded on said second end, said shaft having a smaller diameter portion at said first end and a shoulder formed where said smaller diameter portion meets a remainder of said shaft; and a spring for biasing said cam follower into engagement with said cam lever, said spring being disposed on said smaller diameter portion of said shaft and abutting said shoulder, said spring being further disposed in said wider diameter portion of said through hole in said cam follower, said shaft further comprising an interference extension at said first threaded end so that when said cam lever is in said closed position, a lock extending through said lock hole in said cam lever abuts said interference extension preventing said cam lever from moving to an open position.

14. A lockable quick release apparatus as recited in claim 13, wherein said quick release apparatus attached to blades of a bicycle fork, a first blade being disposed adjacent an end of said cam follower, and a second blade being disposed adjacent said adjuster nut.

15. A lockable quick release apparatus as recited in claim 14, wherein said end of said cam follower and an end of said adjuster nut are knurled.

16. A lockable quick release apparatus as recited in claim 14 wherein said handle of said cam lever prevents said cam lever from rotating by abutting said first fork blade.

17. A lockable quick release apparatus as recited in claim 16, wherein said handle is curved so that said cam lever extends inward toward said adjuster nut to maximize an area of contact between said cam lever and said first fork blade.

18. A lockable quick release apparatus as recited in claim 13, wherein said adjuster nut has a groove formed in said conical outer surface, an o-ring being disposed in said groove to provide a gripping surface to turn said adjuster nut when said cam lever is in said open position.

19. A lockable quick release apparatus comprising:

a cam lever comprising a camming surface, a handle, and a pivot hole;

a cam follower which interacts with said camming surface of said cam lever;

a pivot fitted in said pivot hole;

a shaft having first and second ends, said cam lever being attached on [an adjuster nut] *the pivot* attached on said [second] *first* end; and a spring which biases said cam follower into engagement with said cam lever;

wherein said shaft comprises a surface extending substantially perpendicular to an axis of said shaft, said spring being biased against said substantially perpendicular surface, said surface being integral with said shaft and disposed at a fixed location relative to a length of said shaft.

20. A lockable quick release apparatus as recited in claim 19, wherein said substantially perpendicular surface is formed by reducing at least a portion of an outer diameter of said shaft near at least one of said first and second ends of said shaft.

*21. A lockable quick release apparatus as recited in claim 19, wherein said pivot is a barrel nut.*

* * * * *